Jan. 6, 1925. 1,521,621
W. P. HAMMOND
COMBINED REAR VIEW MIRROR AND TIMEPIECE
Filed Sept. 28, 1923
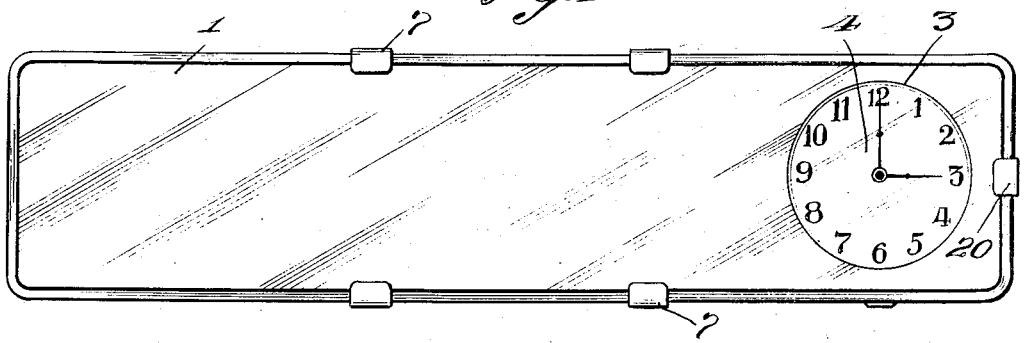
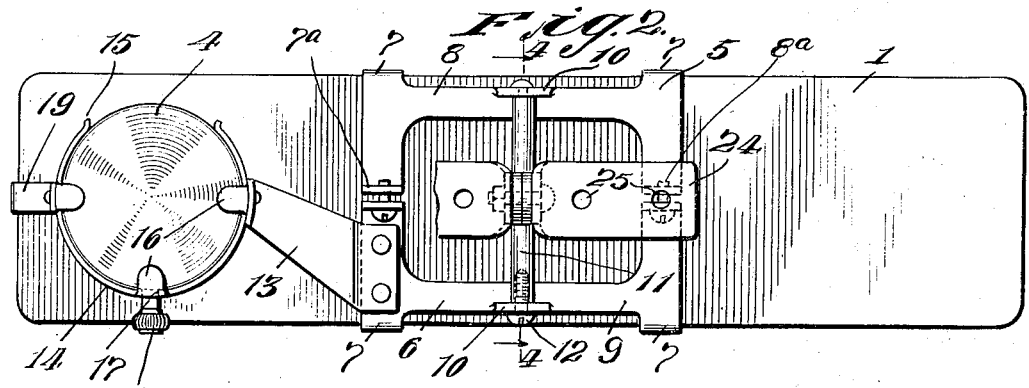
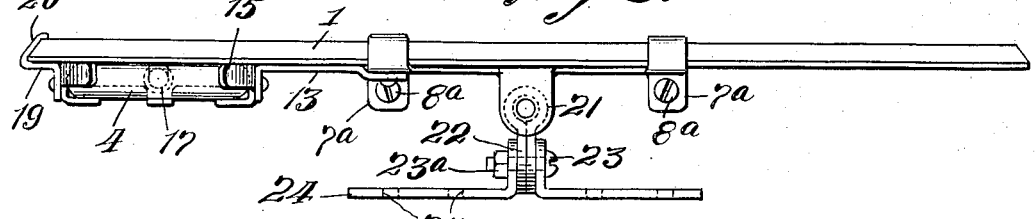
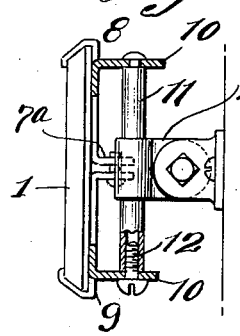
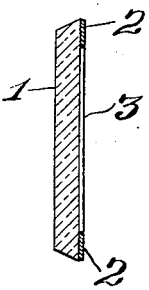
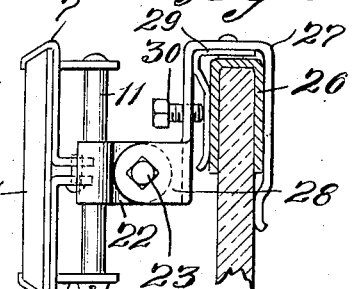
INVENTOR
William P Hammond
BY
Moser, Hammond & Walte
ATTORNEYS Patented Jan. 6, 1925.

1,521,621

UNITED STATES PATENT OFFICE.

WILLIAM P. HAMMOND, OF HARTSDALE, NEW YORK.

COMBINED REAR-VIEW MIRROR AND TIMEPIECE.

Application filed September 28, 1923. Serial No. 665,506.

*To all whom it may concern:*

Be it known that I, WILLIAM P. HAMMOND, a citizen of the United States, residing in Hartsdale, county of Westchester, and State of New York, have invented certain new and useful Improvements in Combined Rear-View Mirrors and Timepieces, of which the following is a specification.

This invention relates to a rear view mirror suitable for use on the windshield of automobiles.

It is one of the objects of the invention to provide a universal rear view mirror bracket which will enable the mirror to be applied with equal facility to either open or closed cars.

It is the usual practice to attach the rear view mirrors to the top rim of the windshield and in the prior mirrors, it has been found necessary to employ an entirely different type of bracket for open and closed cars.

With the prior type of mirror bracket, it has often been impossible to attach the mirror to a closed car without a special bracket because the mirror projects so high above the top of the windshield that insufficient space remains between the top of the windshield and the top of the car to accommodate the mirror. On the other hand, when such brackets are attached to open cars where the windshield is not so high, the mirror may project below the top of the windshield a distance sufficient to interfere with the driver's vision through the windshield, while the space between the top of the windshield and the top of the car is not utilized at all.

By using my mirror bracket, which permits the mirror to be shifted vertically relative to the bracket, the mirror may be adjusted to a lower position when used on closed cars so as not to project against the top of the car and when applied to open cars, the mirror may be adjusted to a higher position where it will largely occupy the space between the top of the windshield and the top of the car, and not interfere with the view through the windshield.

Another object of my invention is to provide an improved bracket for holding the mirror to the windshield and at the same time holding a timepiece against the back of the mirror.

Another object is to provide a combined rear view mirror and timepiece in which the face of the timepiece can be observed through a portion of the glass of which the mirror is composed, thereby protecting the timepiece, and dispensing with the ordinary crystal of the timepiece, should this be desired.

Various other objects and advantages will appear as the description of the invention proceeds.

Referring now to the drawings which illustrate a preferred embodiment of the invention, Fig. 1 is a front elevation of my improved rear view mirror and timepiece.

Fig. 2 is a rear view, showing the supporting bracket for holding the mirror and timepiece.

Fig. 3 is a plan view of the mirror and associated parts.

Fig. 4 is a part sectional view on the line 4—4 of Fig. 2, showing the means permitting vertical adjustment of the mirror.

Fig. 5 is a sectional view of the mirror showing a part of the silver backing removed to permit the timepiece to be seen through the mirror glass.

Fig. 6 is a view of a modified form of bracket for attachment to different types of windshield rim.

In the embodiment illustrated, the mirror comprises a rectangular plate of glass 1, provided with the usual backing 2, a portion of which has been removed at 3, to permit a watch or clock 4 to be seen through the glass of the mirror, while the rest of the mirror has the usual reflecting surface. By thus utilizing a portion of the mirror glass, for the face of the watch or clock, the crystal of the watch can, if desired, be omitted and the unbacked part of the mirror glass be used to cover the face of the watch.

The mirror is provided with a suitable bracket for holding the watch against the back of the mirror and for attaching the mirror to the windshield of the automobile. This bracket in its preferred embodiment comprises a pair of complemental gripping members 5 and 6, with bent finger portions 7, for extending over the edge of the mirror. The finger portions of each member 5 or 6 are connected by cross bars 8 and 9, provided with ears 10, between which the post or rod 11, permitting vertical adjustment of the mirror is held by means of screws 12.

The inner ends of finger pieces 7 of the members 5 and 6 are turned up to provide ears 7ª, through which the screws 8ª are threaded to clamp the two members 5 and 6 of the bracket firmly upon the mirror.

An arm 13 is riveted or otherwise secured to the lower member 6, for holding the watch or clock 4 to the mirror. This arm extends outward from the bracket toward one end of the mirror where it is secured to the watch holder 14 which comprises a circular segment 15 for fitting around the edge of the watch case, and ears 16, for holding the watch against the back of the mirror. A suitable hole 17 is provided at the bottom of the segment for the watch stem 18.

An additional finger 19 is attached to the segment 15 opposite the end of the arm 13 and is provided with a hook 20 for extending over the edge of the mirror to hold the watch bracket rigid.

Fig. 5 shows the backing 2 of the mirror removed at 3 to provide an opening through which the watch can be seen from the front of the mirror.

The means for attaching the mirror to the windshield, comprises a clamp 21, which is bent around the adjusting rod 11, the ears of the clamp being brought together at 22 and a screw 23 inserted through holes in the ears. The brackets 24, provided with holes 25 for receiving the screws for attaching the mirror to the windshield rim are secured on either side of the ears 22 by the screw 23 and the nut 23ª.

When the mirror has been attached to the windshield it can be adjusted by tilting in a horizontal plane, about the rod 11, as a pivot, and in a vertical plane about the screw 23 as a pivot.

To adjust the up and down position of the mirror, the screw 23 is loosened and the rod or post 11 slid up or down through the clamp 21 until the mirror is placed where it will least interfere with the forward vision through the windshield and does not project upward against the top of the car, whereupon the screw 23 is again tightened to hold it in this position.

To enable the mirror to be attached to the windshield provided with flat rims 26, as illustrated in Fig. 6, the brackets 24 are replaced by a flat hook 27, shaped to fit over the rim of the windshield and provided with a pair of ears 28, which fit upon either side of the ears 22 and through which the screw 23 can be inserted. A piece of spring metal 29 is secured to the top of the hook and projects downward as shown and a set screw 30 threaded through the back of the hook presses against the spring to hold the hook upon the windshield.

In compliance with the patent statutes, I have disclosed a preferred embodiment of my invention, but it is to be understood that the claims are not limited to the embodiment shown but that various modifications may be made within the scope thereof and that parts of the device may be used without others.

What I claim is:

1. In a rear view mirror, the combination of means for attaching the mirror to the windshield of an automobile and means permitting the mirror to be shifted in a plane substantially parallel to the windshield to position the major portion of the mirror either above or below the attaching means.

2. In a rear view mirror, the combination of means for attaching the mirror to the windshield, means for holding the mirror and a connection between the two means, including a post and a releasable clamp through which the post can be slid to move the center of the mirror above or below the attaching means.

3. In a rear view mirror, the combination of means to attach the mirror to the windshield adapted to permit the mirror to be tilted in a vertical or horizontal plane, and also to permit the mirror to be shifted to a position above or below the attaching means in a plane substantially parallel to the windshield.

4. A rear view mirror, including a pair of mirror holding members with fingers projecting over the edge of the mirror means for fastening the members together, means connected to the holding members for attaching the mirror to the windshield of an automobile and an arm projecting from one of the holding members for holding a timepiece.

5. A rear view mirror, including a pair of mirror holding members with fingers projecting over the edge of the mirror, means for fastening the members together, means connected to the holding members for attaching the mirror to the windshield of an automobile, means to permit tilting of the mirror and holding members relative to their support in planes at right angles to each other, and an arm projecting from one of the holding members for holding a timepiece against the rear of the mirror.

6. A rear view mirror having a non-reflecting portion, including a pair of mirror holding members with fingers projecting over the edge of the mirror means for fastening the members together, means connected to the holding members for attaching the mirror to the windshield of an automobile, an arm projecting from one of the holding members, a watch holder attached to the arm, a watch in the holder visible through said non-reflecting portion and a finger projecting over front edge of the mirror and attached to the watch holder opposite the arm.

In testimony whereof I have affixed my signature to this specification.

WILLIAM P. HAMMOND.